US011688850B1

(12) United States Patent
He et al.

(10) Patent No.: US 11,688,850 B1
(45) Date of Patent: Jun. 27, 2023

(54) PREPARATION METHOD OF SNO2@SN COATED REDUCED GRAPHENE OXIDE COMPOSITE MATERIAL

(71) Applicant: GUANGDONG UNIVERSITY OF TECHNOLOGY, Guangzhou (CN)

(72) Inventors: Miao He, Guangzhou (CN); Shanshan Wu, Guangzhou (CN); Yefeng Feng, Guangzhou (CN); Kaidan Wu, Guangzhou (CN); Deping Xiong, Guangzhou (CN); Li Chen, Guangzhou (CN); Kunhua Wen, Guangzhou (CN); Zuyong Feng, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 12 days.

(21) Appl. No.: 17/581,953

(22) Filed: Jan. 23, 2022

(51) Int. Cl.
*H01M 4/36* (2006.01)
*C01B 32/194* (2017.01)
(Continued)

(52) U.S. Cl.
CPC ........... *H01M 4/366* (2013.01); *C01B 32/194* (2017.08); *C01B 32/198* (2017.08); *H01M 4/387* (2013.01);
(Continued)

(58) Field of Classification Search
CPC ...... H01M 4/366; H01M 4/387; H01M 4/485; H01M 4/587; C01B 32/194; C01B 32/198;
(Continued)

(56) References Cited

U.S. PATENT DOCUMENTS

2019/0267662 A1    8/2019   Zhamu et al.

FOREIGN PATENT DOCUMENTS

| CN | 104852022 A | 8/2015 |
| CN | 108318510 A | 7/2018 |
| CN | 109348696 A | 2/2019 |

OTHER PUBLICATIONS

Park et al. "A facile hydrazine-assisted hydrothermal method for the deposition of monodisperse SnO-2 nanoparticles onto graphene for lithium ion batteries" J. Mater. Chem., 2012, 22 pgs. 2520-2525 (Year: 2012).*

(Continued)

*Primary Examiner* — Andrew J. Oyer

(57) ABSTRACT

A preparation method of $SnO_2$@Sn coated reduced graphene oxide composite material. By compounding reduced graphene oxide and $SnO_2$, $SnO_2$ undergoes conversion and alloying reactions to form Sn nanoparticles, and the three components have a synergistic effect and good reversibility. Nano $SnO_2$@Sn particles are uniformly distributed on the ultrathin RGO nanosheets. RGO can effectively alleviate volume expansion caused by $SnO_2$ and prevent $SnO_2$@Sn nanoparticles from agglomeration during cycle. The adhesion of $SnO_2$@Sn on RGO can also effectively reduce the repacking of RGO nanosheets, so that the composite material maintains a large surface area during the charge-discharge process, providing sufficient space for the storage of potassium ions. Therefore, the prepared $SnO_2$@Sn coated reduced graphene oxide composite material ($SnO_2$@Sn@RGO) has excellent electrochemical performance, exhibits excellent cycle performance, rate capability and long-term cycle stability, and has a very ideal first coulomb efficient.

19 Claims, 6 Drawing Sheets

(51) Int. Cl.
*C01B 32/198* (2017.01)
*H01M 4/485* (2010.01)
*H01M 4/38* (2006.01)
*H01M 4/587* (2010.01)

(52) U.S. Cl.
CPC .......... *H01M 4/485* (2013.01); *H01M 4/587* (2013.01); *C01P 2002/72* (2013.01); *C01P 2004/03* (2013.01); *C01P 2004/04* (2013.01); *C01P 2004/80* (2013.01); *C01P 2006/40* (2013.01)

(58) Field of Classification Search
CPC .............. C01P 2002/72; C01P 2004/03; C01P 2004/04; C01P 2004/80; C01P 2006/40
See application file for complete search history.

(56) References Cited

OTHER PUBLICATIONS

Qiu et al. "SnO2 nanoparticles anchored on carbon foam as a freestanding anode for high performance potassium-ion batteries" Energy Environ. Sci. 2020 13 pgs. 571-578 (Year: 2020).*

Wu et al. "Reduced graphene oxide coated modified SnO2 forms excellent potassium storage properties" Ceramics International, available online Jan. 25, 2023 (Year: 2023).*

* cited by examiner

PREPARATION METHOD OF SNO2@SN COATED REDUCED GRAPHENE OXIDE COMPOSITE MATERIAL

TECHNICAL FIELD

The present disclosure relates to the field of potassium ion battery manufacturing technology, in particular to a preparation method of a SnO$_2$@Sn coated reduced graphene oxide composite material.

BACKGROUND

Lithium ion batteries are widely used in portable digital products, electric vehicles and energy storage due to the advantages of high open-circuit voltage, long cycle life, high energy density and no memory effect. However, due to the shortcomings of low lithium storage and high price in nature, the further development of the lithium ion batteries in the field of electric vehicles and large-scale energy storage is limited. Potassium is abundant and inexpensive in nature and becomes an ideal material to replace lithium. In order to meet people's sustainable demand for high energy density potassium ion batteries, improving the specific capacity and cycle stability of potassium ion battery anode materials has become an important research direction, for potassium ion batteries.

Tin dioxide (SnO$_2$) is an important metal oxide and has been widely studied in the anode materials of lithium-ion batteries and sodium-ion batteries, while SnO$_2$ is currently less studied in potassium-ion batteries. SnO$_2$ is abundant in resources and environmentally friendly, but its low electrical conductivity, poor reversibility, and large volume change greatly affect its cycle stability and reversible specific capacity, and limit its application. In order to solve the above problems, SnO$_2$ can be modified with conductive materials (especially carbon materials) or special structures can be designed through novel synthetic methods, so as to obtain excellent electrochemical performance. Carbon materials can provide a good conductive network, improve the conductivity of the entire electrode, and buffer the volume change of SnO$_2$ during charging and discharging. Therefore, SnO$_2$ and amorphous carbon, carbon nanotubes and graphene composite material have been consecutively synthesized and applied as anode materials for potassium ion batteries, and their electrochemical properties have been greatly improved.

Carbon-based materials have been widely studied as anode materials for potassium-ion batteries, including graphite, hard carbon, soft carbon, and graphene-based materials. Traditional graphite has good electrical conductivity and various structures, however, the large radius of potassium ion will cause the volume expansion of graphite and lead to poor cycle performance. Graphene has a two-dimensional structure and a large specific surface area, thereby greatly improving the storage of potassium ions. In recent years, people have begun to study lamellate reduced graphene oxide (RGO). The RGO is a two-dimensional carbon material with a novel honeycomb structure, has outstanding physical, chemical and mechanical properties. Therefore, it is researched as a negative electrode material. The RGO, as conductive substrate, can buffer the volume expansion of anode materials, and also can be used as an electron-transport channel due to good electrochemical performance. In addition, RGO is also a good substrate for preserving active substances.

SUMMARY

The technical problem to be solved by the present disclosure is to provide a SnO$_2$@Sn coated reduced graphene oxide composite material (SnO$_2$@Sn@RGO) and a preparation method thereof. The method is simple and easy to operate, and can effectively improve the electronic conductivity of SnO$_2$, improve the rate performance of the material, and at the same time suppress the volume expansion and agglomeration of SnO$_2$, and improve the cycle stability of the material.

The preparation method of the SnO$_2$@Sn coated reduced graphene oxide composite material (SnO$_2$@Sn@RGO) of the present disclosure is a combined method of hydrothermal method, modified Hummers method and high-temperature pyrolysis method. The mass fractions of the SnO$_2$@Sn and the reduced graphene oxide (RGO) in the SnO$_2$@Sn coated reduced graphene oxide composite material (SnO$_2$@Sn@RGO) are 60-80% and 20-40% respectively. The method includes following steps:

step 1: weighing a stannate and an organic compound, and dissolving the stannate and the organic compound in deionized water and organic solvent to obtain a solution with a concentration of 1.0 mol/L, and stirring the solution for 0.5 hours to obtain a milky white solution;

step 2: transferring the milky white solution obtained in step 1 into a polytetrafluoroethylene-lined high-pressure hydrothermal reactor, and holding at 150-220° C. for 15-30 hours;

step 3: cooling the solution in step 2, repeatedly centrifuging the cooled solution with deionized water and anhydrous ethanol at a centrifugal rate of 5000-10000 r/m; removing solution to obtain a white precipitate;

step 4: drying the white precipitate obtained in step 3 at 60-120° C. for 12-24 hours to obtain a white powder;

step 5: slowly adding a nitrate to a solution containing a strong acid, and stirring in ice bath for 0.5 hours:

step 6: cooling the solution in step 5 to −10-5° C., slowly adding graphite powder and strong oxidant, stirring in ice bath for 1-5 hours, and after cooling to room temperature, stirring at room temperature for 1-12 hours;

step 7: adding deionized water to the solution obtained in step 6, holding a temperature at 90-100° C., stirring for 0.5 hours, such that a color of the solution obtained in step 6 changes from dark green to bright yellow, and then cooling to room temperature;

step 8: adding an inorganic compound solution with reducibility to the bright yellow solution in step 7, stirring for 1 hour, standing for 10-24 hours, and pouring off a supernatant for 1-5 times;

step 9: adding deionized water to the solution obtained in step 8, and then stirring for 0.5-3 hours, and pouring off a supernatant to obtain a dark yellow solution;

step 10: slowly adding a strong, base to the dark yellow solution obtained in step 9 until the, dark yellow solution is neutral to obtain a brown solution;

step 11: adding deionized water to the brown solution obtained in step 10, and then stirring for 1-5 hours, and pouring off a supernatant;

step 12: adding an inorganic strong acid to the solution obtained in step 11, washing one time, and stirring for 0.5 hours;

step 13: cooling the solution obtained in step 12, and then centrifuging repeatedly for 0.1-1 hours with deionized water and anhydrous ethanol in a mass ratio of 1:2-8 at a centrifugal rate of 5000-10000 r/m, and pouring off supernatant repeatedly to obtain a black precipitate;

step 14: freeze-drying the black precipitate obtained in step 13 for 12-36 hours to obtain a black powder;

step 15: weighing, the white powder obtained in step 4 and the black powder obtained in step 14 with a mass ratio of 3:0.1-10, and dissolving the weighed powder in deionized water, and ultrasonically dispersing for 0.5 hours;

step 16: drying the solution obtained in step 15 at 50-120° C. for 12-36 hours to obtain a black colloid;

step 17: heating the black colloid obtained in step 16 in an inert atmosphere from a temperature of 25° C. to 600-950° C. at a heating rate of 1-5° C./min; and then holding for 2-5 hours, and cooling to room temperature naturally to obtain the $SnO_2$@Sn coated reduced graphene oxide composite material ($SnO_2$@Sn@RGO).

In step 1, the stannate is a sodium stannate trihydrate, the organic compound is urea, and the organic solvent is anhydrous ethanol.

In step 2, a holding temperature is 180-220° C., and a holding time is 15-20 hours.

In step 3, the centrifugal rate is 8000-10000 r/m.

In step 4, a drying temperature is 60-100° C., and a holding time is 12-24 hours.

In step 5, the nitrate is sodium nitrate, and the strong acid is 98% concentrated sulfuric acid.

In step 6, the solution in step 5 is cooled to −6-2° C., the strong oxidant is potassium permanganate, a stirring time in ice bath is 1-3 hours, and a stirring time at room temperature is 1-8 hours.

In step 7, the holding temperature is 95-98° C..

In step 8, the inorganic compound solution with reducibility is hydrogen peroxide solution, a standing time is 10-18 hours, and the supernatant is poured off for 1-2 times.

In step 9, a stirring time is 0.5-2 hours.

In step 10, the strong base is potassium hydroxide solution.

In step 11, a stirring time is 1-2 hours.

In step 12, the inorganic strong acid is 5% concentrated hydrochloric acid.

In step 13, the mass ratio of the deionized water and the anhydrous ethanol is 1: 2-5, the centrifugal rate is 6000-10000 r/m, and a centrifugal time is 0.1-0.5 hours.

In step 14, a freeze-drying time is 18-28 hours.

In step 15, the mass ratio of the white powder obtained in step 4 and the black powder obtained in step 14 is 3:0.2-5.

In step 16, a drying temperature is 60-100° C., and a drying time is 18-28 hours.

In step 17, the inert atmosphere is one or more of nitrogen or argon; the heating rate is 5° C./min, a holding temperature is 700-800° C., and a holding time is 2-3 hours.

The $SnO_2$@Sn coated reduced graphene oxide composite material is prepared by the above method, and is used as a potassium ion battery anode material.

The $SnO_2$@Sn coated reduced graphene oxide composite material ($SnO_2$@Sn@RGO) of the present disclosure has excellent cycle performance, rate performance, cycle stability and excellent first Coulomb efficiency. The three components of $SnO_2$, Sn and RGO achieve a synergistic effect, which effectively inhibits the agglomeration of $SnO_2$ and the accumulation of RGO flakes, increases the electronic conductivity and the diffusion area of potassium ions, thereby effectively improving the cycle performance, rate capability and cycle stability of the material and achieving a high first Coulomb efficiency.

DETAILED DESCRIPTION OF PREFERRED EMBODIMENTS

Figure 1:
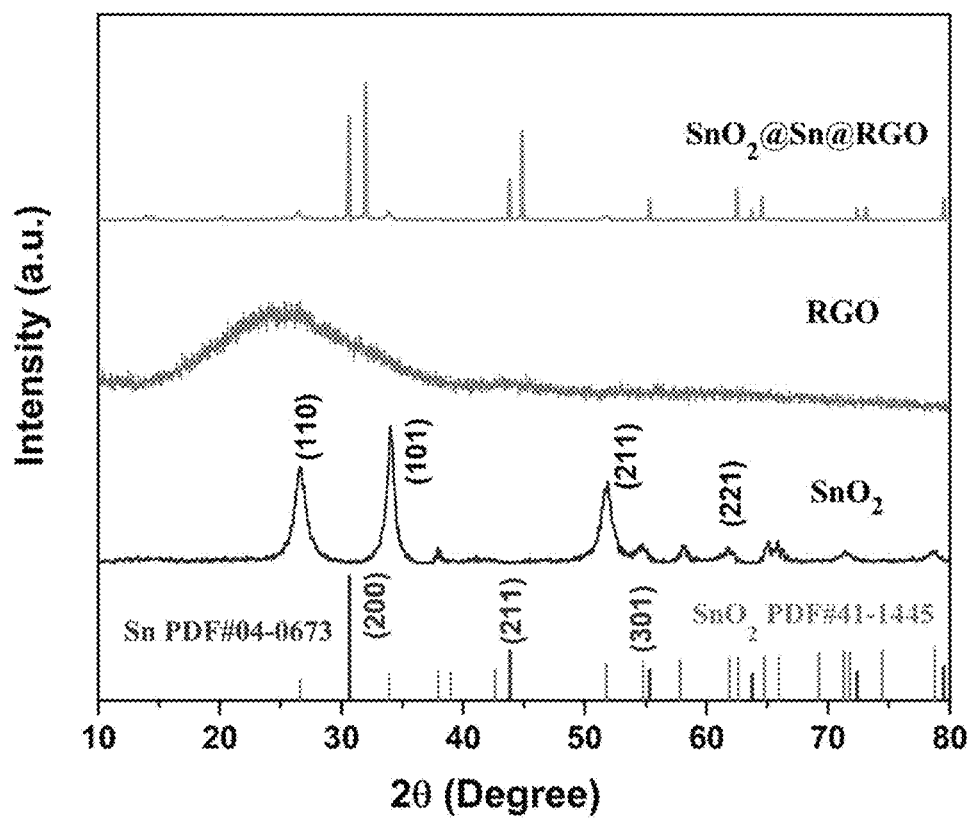
FIG. 1 is an XRD pattern obtained by XRD analysis of the $SnO_2$@Sn coated reduced graphene oxide composite material ($SnO_2$@Sn@RGO) prepared in Example 1 of the present disclosure, pure $SnO_2$ and pure RGO.

The present disclosure is further described below by taking the $SnO_2$@Sn coated reduced graphene oxide composite material ($SnO_2$@Sn@RGO) as specific examples, but the present disclosure is not limited to the examples.

Example 1 step 1: weighing a sodium stannate trihydrate and urea, and dissolving the sodium stannate trihydrate and urea in deionized water and anhydrous ethanol to obtain a solution with a concentration of 1.0 mol/L, and stirring the solution for 0.5 hours to obtain a milky white solution;

step 2: transferring the milky white solution obtained in step 1 into a polytetrafluoroethylene-lined high-pressure hydrothermal reactor, and holding at 200° C. for 18 hours:

step 3: cooling the solution in step 2, repeatedly centrifuging the cooled solution with deionized water and anhydrous ethanol at a centrifugal rate of 10000 r/m; removing solution to obtain a white precipitate;

step 4: drying the white precipitate obtained in step 3 at 100° C. for 18 hours to obtain a white powder;

step 5: slowly adding a nitrate to a 98% concentrated sulfuric acid, and stirring in ice bath for 0.5 hours;

step 6: cooling the solution in step 5 to −4° C., slowly adding graphite powder and potassium permanganate., stirring in ice bath for 1 hour, and, after cooling to room temperature, stirring at room temperature for 4 hours;

step 7: adding deionized water to the solution obtained in step 6, holding a temperature at 96-98° C., stirring, for 0.5 hours, such that a color of the solution obtained in step 6 changes from dark green to bright yellow, and then cooling to room temperature;

step 8: adding an hydrogen peroxide solution to the bright yellow solution in step 7, stirring for 1 hour, standing for 12 hours, and pouring off a supernatant for 1-3 times;

step 9: adding deionized water to the solution obtained in step 8, and then stirring for 0.5 hours, and pouring off a supernatant to obtain a dark yellow solution;

step 10: slowly adding a potassium hydroxide solution to the dark yellow solution obtained in step 9 until the dark yellow solution is neutral to obtain a brown solution;

step 11: adding deionized water to the brown solution obtained in step 10, and then stirring for 1.5 hours, and pouring off a supernatant;

step 12: adding an 5% concentrated hydrochloric acid to the solution obtained in step 11, washing one time, and stirring for 0.5 hours;

step 13: cooling the solution obtained in step 12, and then centrifuging repeatedly for 0.5 hours with deionized water and anhydrous ethanol in a mass ratio of 1:2 at a centrifugal rate of 8000 r/m, and pouring off supernatant repeatedly to obtain a black precipitate;

step 14: freeze-drying the black precipitate obtained in step 13 for 24 hours to obtain a black powder:

step 15: weighing the white powder obtained in step 4 and the black powder obtained in step 14 with a mass ratio of 3:2, and dissolving the weighed powder in deionized water, and ultrasonically dispersing for 0.5 hours;

step 16: drying the solution obtained in step 15 at 80° C. for 24 hours to obtain a black colloid;

step 17: heating the black colloid obtained in step 16 in an inert atmosphere from a temperature of 25° C. to 750° C. at a heating rate of 5° C./min; and then holding for 2 hours, and cooling to room temperature naturally to obtain the $SnO_2$@Sn coated reduced graphene oxide composite material ($SnO_2$@Sn@RGO).

Figure 2:
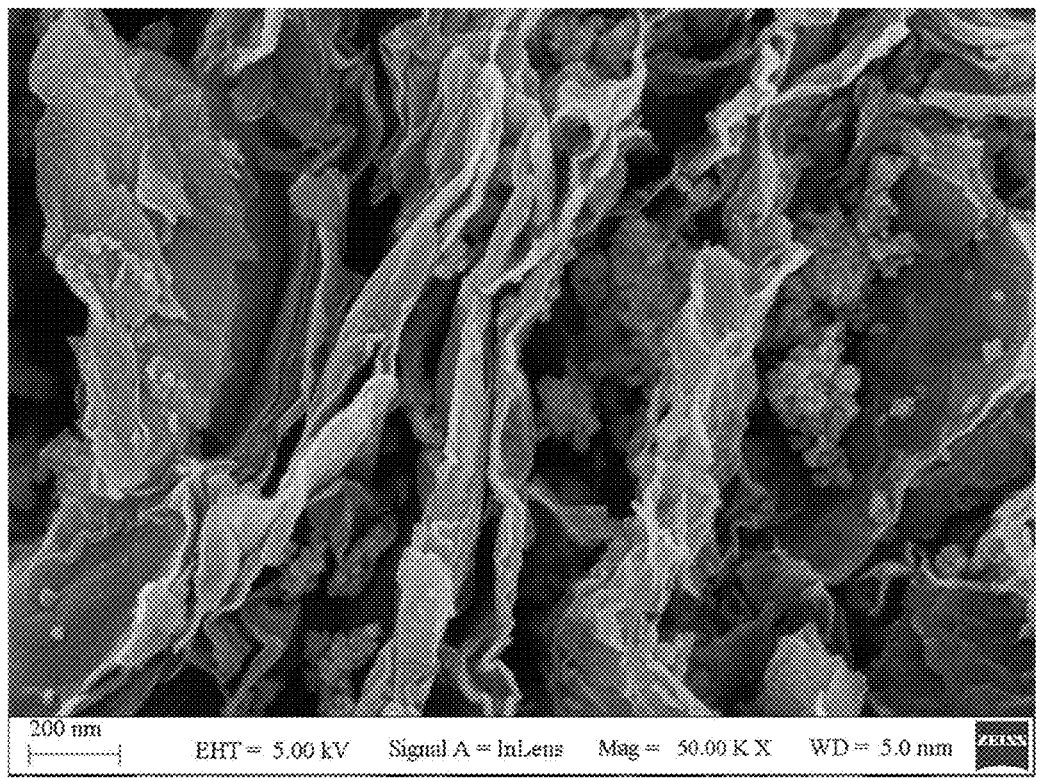
FIG. 2 is an SEM image of the $SnO_2$@Sn coated reduced graphene oxide composite material ($SnO_2$@Sn@RGO) prepared in Example 1 of the present disclosure.
Figure 3:
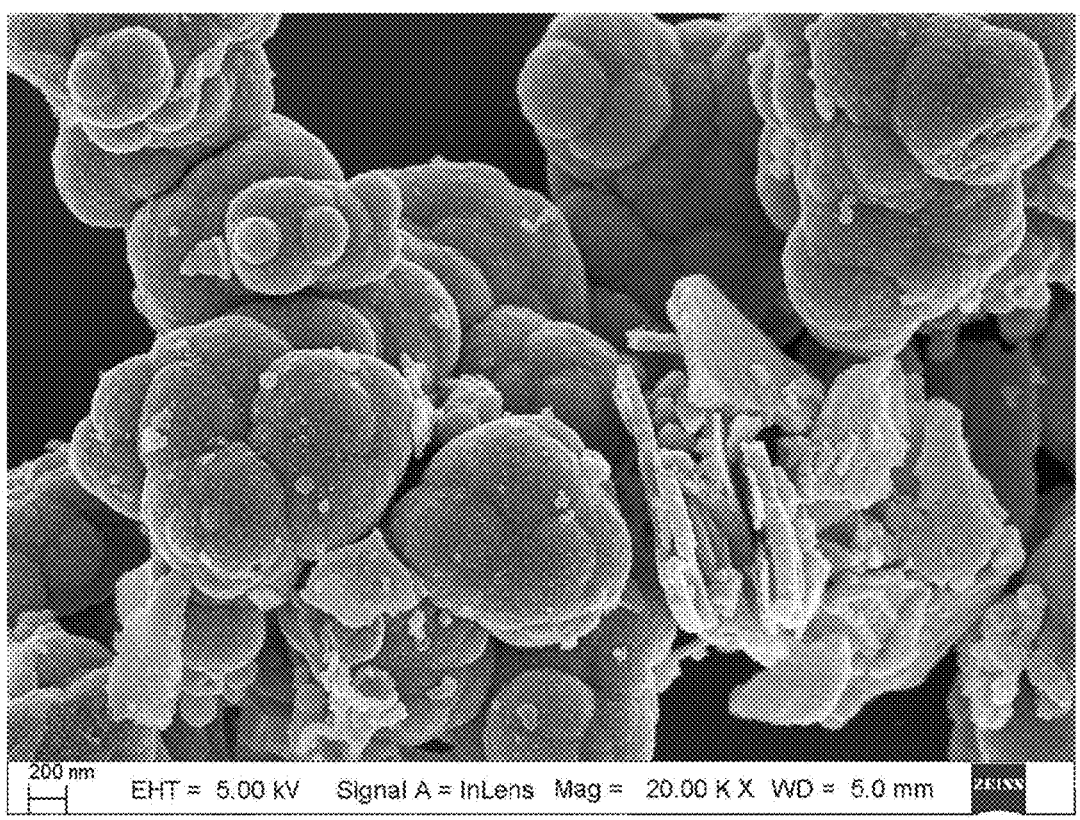
FIG. 3 is an. SEM image of the pure-phase spherical $SnO_2$ material prepared in Example 1 of the present disclosure.
Figure 4:
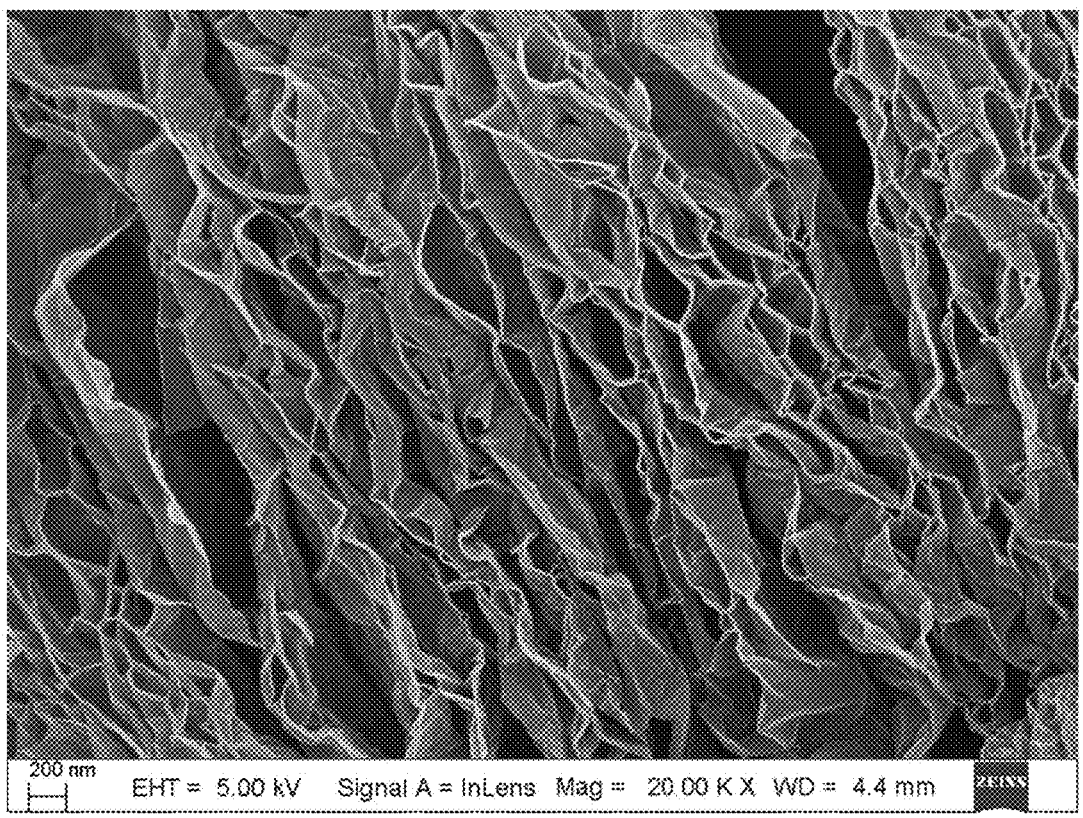
FIG. 4 is an SEM image of the pure-phase layered GO material prepared in Example 1 of the present disclosure.
Figure 5:
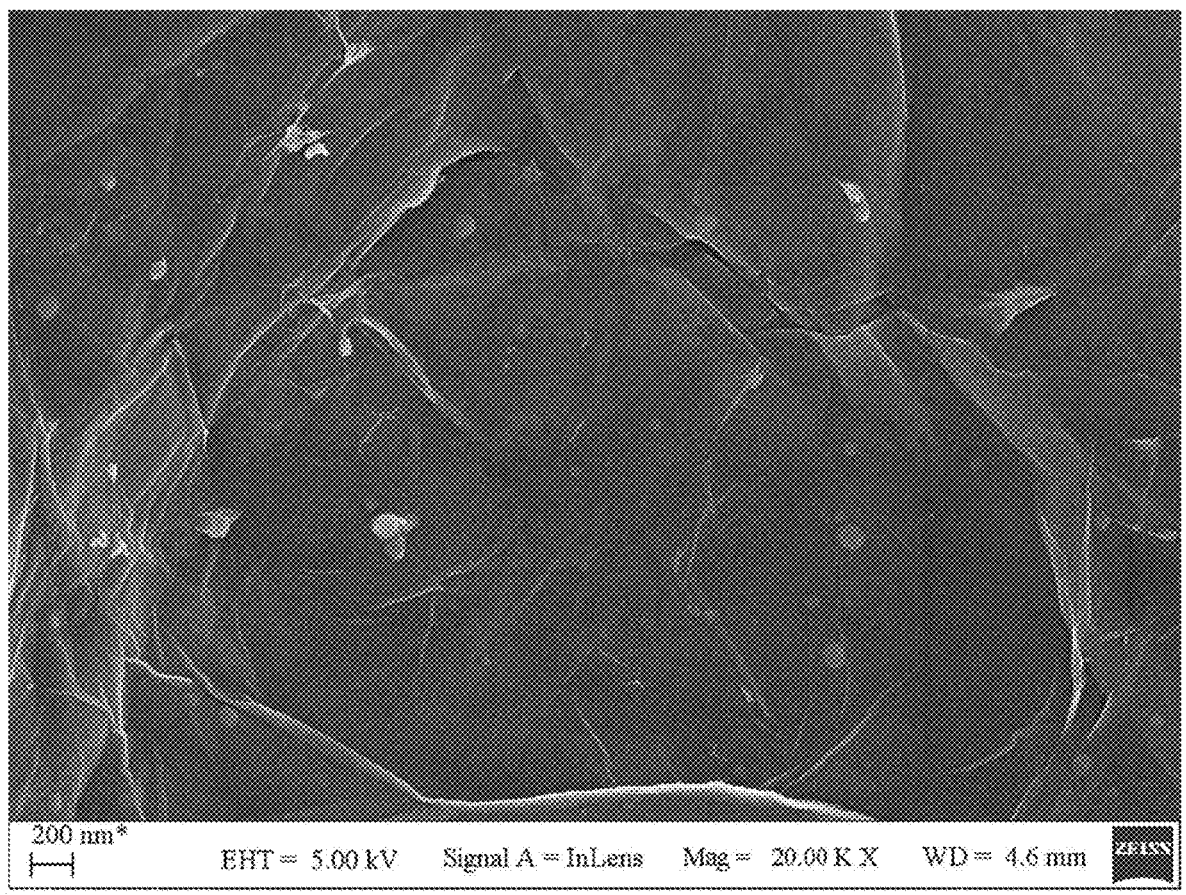
FIG. 5 is an SEM image of the pure-phase layered. RGO material prepared in Example 1 of the present disclosure.
Figure 6:
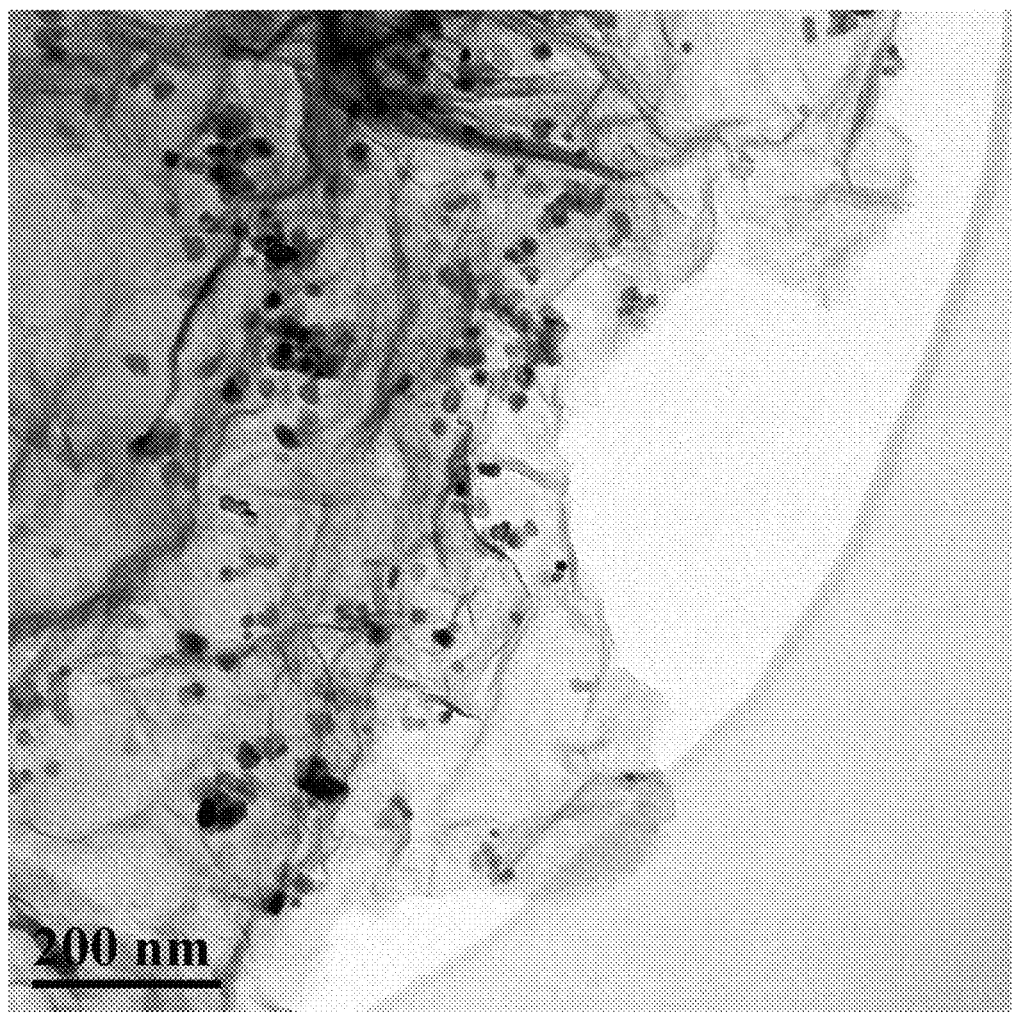
FIG. 6 is a TEM image of the $SnO_2$@Sn coated reduced graphene oxide composite material ($SnO_2$@Sn@RGO) prepared in Example 1 of the present disclosure.
Figure 7:
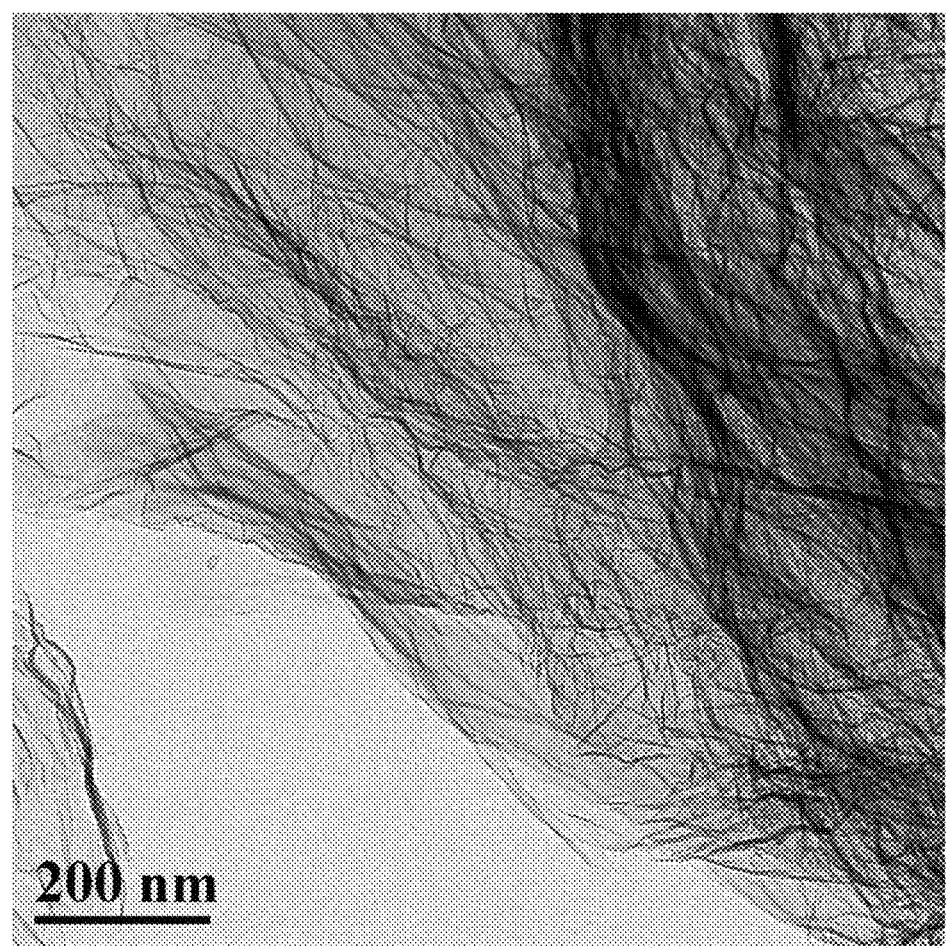
FIG. 7 is a TEM image of the pure-phase layered RGO material prepared in Example 1 of the present disclosure.

The $SnO_2$@Sn coated RGO composite material ($SnO_2$@Sn@RGO) prepared in Example 1, pure $SnO_2$ and pure RGO are analyzed by XRD and SEM/TEM. The XRD pattern is shown in FIG. 1. The diffraction peaks at 26.6°, 33.9°, and 51.8° represent the (110) (101) (211) crystal faces of $SnO_2$ (JCPDS No. 41-1445), respectively. The diffraction peaks at 30.6°, 43.8°, and 44.9° represent the (200) (220) (211) crystal faces of Sn (JCPDS No. 04-0673), respectively. The diffraction peaks of $SnO_2$ and Sn are observed in the composite material $SnO_2$@Sn@RGO. It is indicated that $SnO_2$ and Sn exist in the composite material $SnO_2$@Sn@RGO. While no diffraction peak of RGO is observed, which may be because the composition of RGO in the composite material is less, and the high crystallinity of Sn obscures the diffraction intensity of RGO. In addition, no other peaks were detected in the XRD pattern, indicating that the prepared samples have a very high purity. The SEM image of the $SnO_2$@Sn coated reduced graphene oxide composite material ($SnO_2$@Sn@RGO) prepared in Example 1 of the present disclosure is shown in FIG. 2, and the SEM image of the pure-phase spherical $SnO_2$ material prepared in Example 1 of the present disclosure is shown in FIG. 3, the SEM image of the pure-phase layered GO material prepared in Example 1 of the present disclosure is shown in FIG. 4, and the SEM image of the pure-phase layered RGO material prepared in Example 1 of the present disclosure is shown in FIG. 5. From the comparison of FIG. 2, FIG. 3, FIG. 4, and FIG. 5, it can be seen that the GO, RGO and $SnO_2$@Sn@RGO composite material present a layered two-dimensional graphene-like morphology with wrinkles. $SnO_2$ presents a spherical morphology, which confirms that the white spherical particles between the RGO layers of the $SnO_2$@Sn@RGO composite material are nanoparticles of $SnO_2$ and Sn. Compared with the GO layer, the RGO layer is obviously thinner, indicating that the GO material is stacked between layers to form an agglomeration. While, no agglomeration is found in the $SnO_2$@Sn@RGO composite material. The $SnO_2$@Sn nanoparticles are anchored on the surface of RGO and uniformly distributed, such that the layered structure of RGO is maintained. Since the $SnO_2$@Sn particles are anchored in the RGO layer, the re-stacking of RGO nanoparticles can be inhibited, and RGO can also prevent the agglomeration of $SnO_2$@Sn nanoparticles, thereby maintaining a good nanosheet structure. The TEM image of the $SnO_2$@Sn coated reduced graphene oxide composite material ($SnO_2$@Sn@RGO) prepared in Example 1 of the present disclosure is shown in FIG. 6. The TEM image of the pure-phase layered RGO material prepared in Example 1 of the present disclosure is shown in FIG. 7. It is further verified that the RGO and $SnO_2$@Sn@RGO composite material have a layered structure. The particles with a darker color in the $SnO_2$@Sn@RGO composite are $SnO_2$@Sn nanoparticles and the lighter ones are RGO nanosheets. According to the mass-thickness contrast effect of the transmission electron microscope, the electrons passing through substances with large atomic weight has weaker intensity, so the color is darker, and the electrons passing through substances with small atomic weight has stronger intensity, so the color is brighter. The $SnO_2$@Sn nanoparticles with a particle size of about 10 nm are well adhered to the RGO nanolayer, with a large amount and a relatively uniform distribution, which meet the required structure and morphology requirements.

The $SnO_2$@Sn coated reduced graphene oxide composite material ($SnO_2$@Sn@RGO) prepared in Example 1, acetylene black, and a binder PVDF are dissolved in N-Methylpyrrolidone in a ratio of 7.5:1.5:1.5 and stirred to obtain a suspension. The obtained suspension is coated on copper foil and the copper foil is then vacuum-dried in vacuum for 12 hours to obtain a positive electrode sheet. A button battery is then assembled in an argon-filled glove box. The $SnO_2$@Sn coated reduced graphene oxide composite material ($SnO_2$@Sn@RGO) is used as positive electrode, potassium sheet is used as the negative electrode, the battery separator adopts glass fiber, and the electrolyte is 0.8 M $KPF_6$ in EC and DEC (1:1, v/v). The assembled button battery is tested for electrochemical performance. The results show that the $SnO_2$@Sn coated reduced graphene oxide composite material ($SnO_2$@Sn@RGO) prepared in Example 1 has excellent cycle performance, rate capability and cycle stability.

Figure 8:
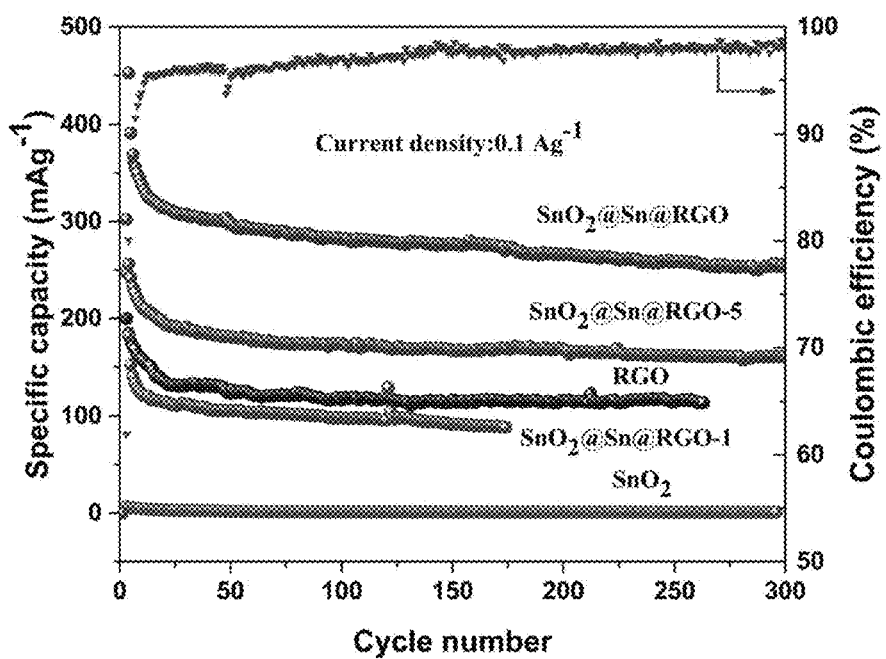
FIG. 8 shows charge-discharge cycle performance under a current density of 0.1 $Ag^{-1}$ of button batteries respectively made from the $SnO_2$@Sn coated reduced graphene oxide composite material ($SnO_2$@Sn@RGO) prepared in Example 1, the pure-phase spherical $SnO_2$ and pure-phase layered RGO prepared in Example 1, ($SnO_2$@Sn@RGO-5) prepared in Example 2 and ($SnO_2$@Sn@RGO-1) prepared in Example 3.

A button battery is made from the $SnO_2$@Sn coated reduced graphene oxide composite material ($SnO_2$@Sn@RGO) prepared in Example 1, pure-phase spherical. $SnO_2$ and pure-phase layered RGO prepared in Example 1, $SnO_2$@Sn@RGO-5 prepared in Example 2 and $SnO_2$@Sn@RGO-1 composite prepared in Example 3. The charge-discharge cycle performance under a current density of 0.1 $Ag^{-1}$ of the button battery is shown in FIG. 8. The capacity of $SnO_2$@Sn@RGO composite material decreases seriously in the, first ten cycles due to the occurrence of side, reactions, and then the capacity gradually stabilizes. The first Coulomb efficiency is as high as 72.87%. After 300 cycles, SnO$_2$@Sn@RGO still shows a high discharge capacity of 252.6 mAhg$^{-1}$, and the Coulomb efficiency remains above 99%, showing an excellent capacity performance. While, the four comparative samples show unsatisfactory specific discharge capacities respectively when cycled for 300 cycles. The specific discharge capacities of SnO$_2$, RGO, SnO$_2$@Sn@RGO-5 prepared in Example 2, and SnO$_2$@Sn@RGO-1 prepared in Example 3 are 1.1 mAhg$^{-1}$, 21.8 mAhg$^{-1}$, 159.1 mAhg$^{-1}$ and 88.6 mAhg$^{-1}$, respectively. It can be seen that the SnO$_2$@Sn@RGO composite material in Example 1 exhibits the best cycle performance, while pure SnO$_2$ has the worst performance. The reasons may be the following. First, the structure of the composite nanosheets facilitates capacity growth since the contact area between the anode and the electrolyte is increased. Second, the strong synergistic effect of RGO with SnO$_2$ and Sn particles can effectively relieve stress and provide fast transport channels between electrons and ions. Finally, during the charge-discharge process, the layered structure of graphene is beneficial to the stability of the SEI film to achieve excellent cycle performance. In addition, RGO itself has a certain theoretical specific capacity and good electrical conductivity. SnO$_2$ is adhered to the RGO flakes, which relieves the volume expansion of SnO$_2$, so that the material maintains good activity during the charge-discharge process, thereby relatively improving its electrochemical performance. From the above results, it can be seen that the reversible capacity and cycle stability of the material can be effectively improved by coating SnO$_2$@Sn with reduced graphene oxide.

Figure 9:
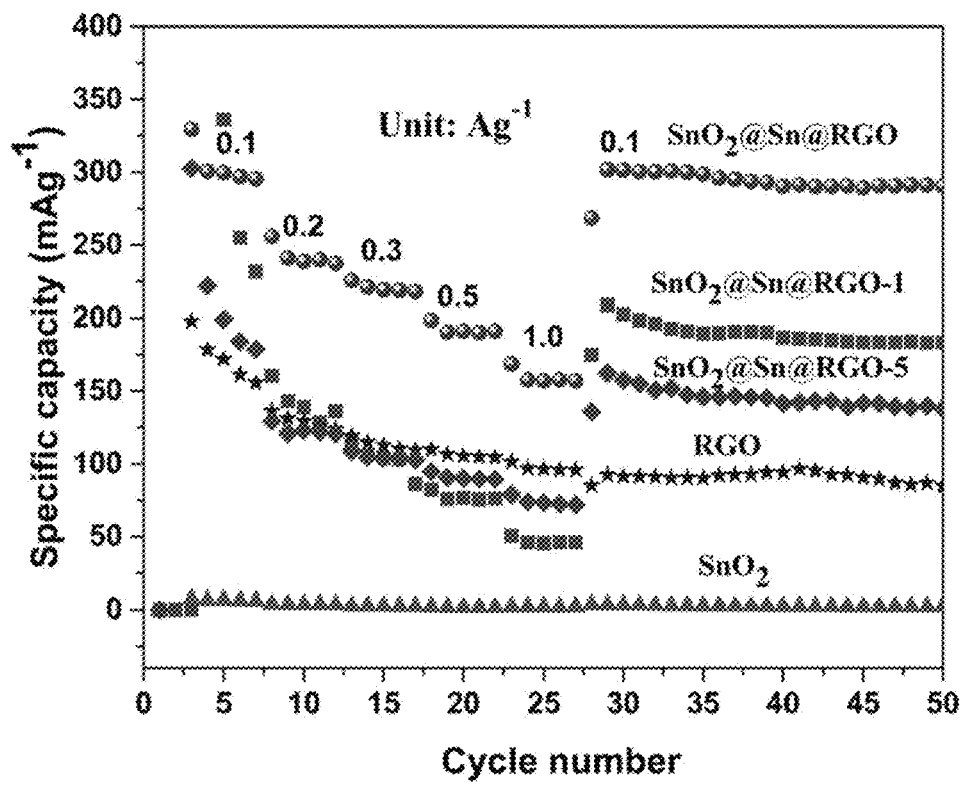
FIG. 9 shows rate performance under a voltage of 0.1-3.0 V and a current density of 0.1-1.0 $Ag^{-1}$ of button batteries respectively made from the $SnO_2$@Sn coated reduced graphene oxide composite material ($SnO_2$@Sn@RGO) prepared in Example 1, the pure-phase spherical $SnO_2$ and pure-phase layered RGO prepared in Example 1, ($SnO_2$@Sn@RGO-5) prepared in Example 2 and ($SnO_2$@Sn@RGO-1) prepared in Example 3.

A button battery is made from the SnO$_2$@Sn coated reduced graphene oxide composite material (SnO$_2$@Sn@RGO) prepared in Example 1, pure-phase spherical SnO$_2$ and pure-phase layered RGO prepared in Example 1, SnO$_2$@Sn@RGO-5 prepared in. Example 2 and the SnO$_2$@Sn@RGO-1 composite prepared in Example 3. The rate performance under the voltage of 0.1-3.0 V and the current density of 0.1-1.0 Ag$^{-1}$ of the button battery is shown in. FIG. 9. When the current, densities are respectively 0.1, 0.2. 0.3, 0.5, 1.0, 0.1 Ag$^{-1}$, and the corresponding reversible specific capacities of the SnO$_2$@Sn@RGO composite material prepared in Example 1 are 516.7, 255.9, 225.0, 198.5, 168.7, 268.5 mAhg$^{-1}$, respectively. In contrast, at the same rate current densities, the reversible capacities of the SnO$_2$ electrode prepared in Example 1 are 652.3, 4.1, 2.9. 2.2, 2.2, 3.6 mAhg$^{-1}$, respectively. The reversible capacities of the RGO electrodes prepared in Example 1 are 647.9, 136.4, 119.4, 109.8, 101.5, 92.5 mAhg$^{-1}$, respectively. The reversible capacities of the SnO$_2$@Sn@RGO-5 electrode prepared in Example 2 are 302.6, 129.1, 108.7, 94.7, 78.8, 135.9 mAhg$^{-1}$, respectively. The reversible capacities of the SnO$_2$@Sn @RGO-1 electrode prepared in Example 3 are 336.1, 160.4, 114.9, 82.3, 50.6, 174.8 mAhg$^{-1}$, respectively. It is confirmed that the SnO$_2$@Sn@RGO composite material prepared in Example 1 has the excellent rate performance. The reasons are the following. First, the RGO has excellent electronic conductivity. Second, the RGO has synergistic effect with SnO$_2$ and Sn particles. The results show that RGO plays an important role in electron transfer, and the addition of RGO is of great significance to improve the rate performance of the electrode. From the above results, it can be seen that the SnO$_2$@Sn coated RGO can effectively improve the capacity of the material under high current density.

Figure 10:
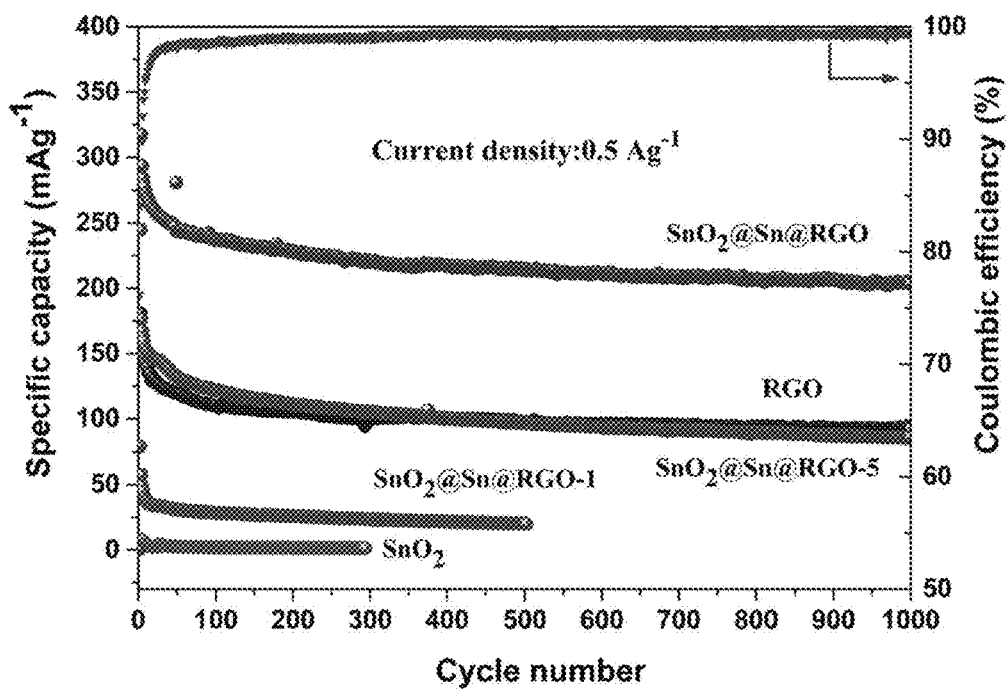
FIG. 10 shows charge-discharge long cycle performance under a current density of 0.5 $Ag^{-1}$ of button batteries respectively made from the $SnO_2$@Sn coated reduced graphene oxide composite material ($SnO_2$@Sn@RGO) prepared in Example 1, the pure-phase spherical $SnO_2$ and pure-phase layered RGO prepared in Example 1, ($SnO_2$@Sn@RGO-5) prepared in Example 2 and ($SnO_2$@Sn@RGO-1) prepared in Example 3.

A button battery is made from the SnO$_2$@Sn coated reduced graphene oxide composite material (SnO$_2$@Sn@RGO) prepared in Example 1, pure-phase spherical SnO$_2$ and pure-phase layered RGO prepared in Example 1, SnO$_2$@Sn@RGO-5 prepared in Example 2 and the SnO$_2$@Sn@RGO-1 composite prepared in Example 3. The charge-discharge long cycle performance under a current density of 0.5 Ag$^{-1}$ of the button battery is shown in FIG. 10. The SnO$_2$@Sn@RGO composite material prepared in Example 1 has a capacity of 203.6 mAhg$^{-1}$ after 1000 cycles, and a stable Coulomb efficiency of about 99%. The capacities of the SnO$_2$ electrode prepared in Example 1, the RGO electrode prepared in Example 1, the SnO$_2$@Sn@RGO-5 composite electrode prepared in Example 2, SnO$_2$@Sn@RGO-1 composite material electrode prepared in Example 3 are 1.4 mAhg$^{-1}$, 92.5 mAhg$^{-1}$, 85.7 mAhg$^{-1}$, respectively. Compared with the electrochemical properties of other four electrodes, the long-term cycle stability of the SnO$_2$@Sn@RGO composite material prepared in Example 1 is obviously superior, while the other four electrodes all show poor performance. Since pure SnO$_2$ may undergo severe structural distortion during embedded potassium and depotassication processes, the structure of SnO$_2$@Sn@RGO may help to accommodate this structural change. Second, in the SnO$_2$@Sn@RGO electrode, RGO not only becomes a part of the active material due to its capacity, but also acts as a conductive network during charge-discharge process. In addition, RGO as a matrix can prevent SnO$_2$@Sn nanoparticles from agglomerating during cycle. The adhesion of SnO$_2$@Sn to RGO also effectively reduces the repacking of RGO flakes, thereby maintaining a large surface of the composite material during charge-discharge cycles. The large surface has abundant active sites and provides enough space for the localization of potassium ions, such that a large capacity is achieved. However, pure SnO$_2$ cannot effectively transfer electrons at large current density due to its low conductivity, so large polarization cannot be avoided, which results agglomeration, lower capacity and lower rate capability. It is indicated that the RGO has a positive effect on electrode performance and it is necessity to add RGO. It can be seen that the long-cycle stability and structural stability of the material can be effectively improved by coating SnO$_2$@Sn with reduced graphene oxide.

Example 2 step 1: weighing a sodium stannate trihydrate and urea, and dissolving the sodium stannate trihydrate and urea in deionized water and anhydrous ethanol to obtain a solution with a concentration of 1.0 mol/L, and stirring the solution for 0.5 hours to obtain a milky white solution;

step 2: transferring the milky white solution obtained in step 1 into a polytetrafluoroethylene-lined high-pressure hydrothermal reactor, and holding at 200° C. for 18 hours;

step 3: cooling the solution in step 2, repeatedly centrifuging the cooled solution with deionized water and anhydrous ethanol at a centrifugal rate of 10000 r/m; removing solution to obtain a white precipitate;

step 4: drying the white precipitate obtained in step 3 at 100° C. for 18 hours to obtain a white powder;

step 5: slowly adding a nitrate to a 98% concentrated sulfuric acid, and stirring in ice bath for 0.5 hours;

step 6: cooling the solution in step 5 to −4° C., slowly adding graphite powder and potassium permanganate, stirring in ice bath for 1 hour, and after cooling to room temperature, stirring at room temperature for 4 hours;

step 7: adding deionized water to the solution obtained in step 6, holding a temperature at 96-98° C., stirring for 0.5 hours, such that a color of the solution obtained in step 6 changes from dark green to bright yellow, and then cooling to room temperature;

step 8: adding an hydrogen peroxide solution to the bright yellow solution in step 7, stirring for 1 hour, standing for 12 hours, and pouring off a supernatant for 1-3 times;

step 9: adding deionized water to the solution obtained in step 8, and then stirring for 0.5 hours, and pouring off a supernatant to obtain a dark yellow solution;

step 10: slowly adding a potassium hydroxide solution to the dark yellow solution obtained in step 9 until the dark yellow solution is neutral to obtain a brown solution;

step 11: adding deionized water to the brown solution obtained in step 10, and then stirring for 1.5 hours, and pouring off a supernatant;

step 12: adding an 5% concentrated hydrochloric acid to the solution obtained in step 11 washing one time, and stirring for 0.5 hours;

step 13: cooling the solution obtained in step 12, and then centrifuging repeatedly for 0.5 hours with deionized water and anhydrous ethanol in a mass ratio of 1:2 at a centrifugal rate of 8000 r/m, and pouring off supernatant repeatedly to obtain a black precipitate;

step 14: freeze-drying the black precipitate obtained in step 13 for 24 hours to obtain a black powder;

step 15: weighing the white powder obtained in step 4 and the black powder obtained in step 14 with a mass ratio of 3:5, and dissolving the weighed powder in deionized water, and ultrasonically dispersing for 0.5 hours;

step 16: drying the solution obtained in step 15 at 80° C. for 24 hours to obtain a black colloid;

step 17: heating the black colloid obtained in step 16 in an inert atmosphere from a temperature of 25° C. to 750° C. at a heating rate of 5° C./min; and then holding for 2 hours, and cooling to room temperature naturally to obtain the $SnO_2$@Sn coated reduced graphene oxide composite material ($SnO_2$@Sn@RGO).

The $SnO_2$@Sn coated reduced graphene oxide composite material ($SnO_2$@Sn@RGO-5) prepared in Example 2, acetylene black, and a binder PVDF are dissolved in N-Methylpyrrolidone in a ratio of 7.5:1.5:1.5 and stirred to obtain a suspension. The obtained suspension is coated on a copper foil and the copper foil is then vacuum-dried in vacuum for 12 hours to obtain a positive electrode sheet. A battery is then assembled in an argon-filled glove box. The $SnO_2$@Sn coated reduced graphene oxide composite material ($SnO_2$@Sn@RGO-5) is used as positive electrode, potassium sheet is used as the negative electrode, the battery separator is glass fiber, and the electrolyte is 0.8 M $KPF_6$ in EC and DEC (1:1, v/v). The assembled, button battery is tested for electrochemical performance. The results show that the $SnO_2$@Sn coated reduced graphene oxide composite material ($SnO_2$@Sn@RGO-5) prepared in Example 2 has excellent cycle performance, rate capability and cycle stability.

Example 3 step 1: weighing a sodium stannate trihydrate and urea, and dissolving the sodium stannate trihydrate and urea in deionized water and anhydrous ethanol to obtain a solution with a concentration of 1.0 mol/L, and stirring the solution for 0.5 hours to obtain a milky white solution;

step 2: transferring the milky white solution obtained in step 1 into a polytetrafluoroethylene-lined high-pressure hydrothermal reactor, and holding at 200° C. for 18 hours;

step 3: cooling the solution in step 2, repeatedly centrifuging the cooled solution with deionized water and anhydrous ethanol at a centrifugal rate of 10000 r/m; removing solution to obtain a white precipitate;

step 4: drying the white precipitate obtained in step 3 at 100° C. for 18 hours to obtain a white powder;

step 5: slowly adding a nitrate to a 98% concentrated sulfuric acid, and stirring in ice bath for 0.5 hours;

step 6: cooling the solution in step 5 to −4 slowly adding graphite powder and potassium permanganate, stirring in ice bath for 1 hour, and after cooling to room temperature, stirring at room temperature for 4 hours;

step 7: adding deionized water to the solution obtained in step 6, holding a temperature at 96-98° C., stirring for 0.5 hours, such that a color of the solution obtained in step 6 changes from dark green to bright yellow, and then cooling to room temperature;

step 8: adding an hydrogen peroxide solution to the bright yellow solution in step 7, stirring for 1 hour, standing for 12 hours, and pouring off a supernatant for 1-3 times;

step 9: adding deionized water to the solution obtained in step 8, and then stirring for 0.5 hours, and pouring off a supernatant to obtain a dark yellow solution;

step 10: slowly adding a potassium hydroxide solution to the dark yellow solution obtained in step 9 until the dark yellow solution is neutral to obtain a brown solution;

step 11: adding deionized water to the brown solution obtained in step 10, and then stirring for 1.5 hours, and pouring, off a supernatant;

step 12: adding an 5% concentrated hydrochloric acid to the solution obtained in step 11, washing one time, and stirring for 0.5 hours;

step 13: cooling the solution obtained in step 12, and then centrifuging repeatedly for 0.5 hours with deionized water and anhydrous ethanol in a mass ratio of 1:2 at a centrifugal rate of 8000 r/m, and pouring off supernatant repeatedly to obtain a black precipitate;

step 14: freeze-drying the black precipitate obtained in step 13 for 24 hours to obtain a black powder;

step 15: weighing the white powder obtained in step 4 and the black powder obtained in step 14 with a mass ratio of 3:0.4, and dissolving, the weighed powder in deionized water, and ultrasonically dispersing for 0.5 hours;

step 16: drying the solution obtained in step 15 at 80° C. for 24 hours to obtain a black colloid;

step 17: heating the black colloid obtained in step 16 in an inert atmosphere from a temperature of 25° C. to 750° C. at a heating rate of 5° C./min; and then holding for 2 hours, and cooling to room temperature naturally to obtain the $SnO_2$@Sn coated reduced graphene oxide composite material ($SnO_2$@Sn@RGO).

The $SnO_2$@Sn coated reduced graphene oxide composite material ($SnO_2$@Sn@RGO-1) prepared in Example 3, acetylene black, and a binder PVDF are dissolved in N-Methylpyrrolidone in a ratio of 7.5:1.5:1.5 and stirred to obtain a suspension. The obtained suspension is coated on copper foil and the copper foil is then vacuum-dried in vacuum for 12 hours to obtain a positive electrode sheet. A battery is then assembled in an argon-filled glove box. The $SnO_2$@Sn coated reduced graphene oxide composite material ($SnO_2$@Sn@RGO-1) is used as positive electrode, potassium sheet is used as the negative electrode, the battery separator is glass fiber, and the electrolyte is 0.8 M $KPF_6$ in EC and DEC (1:1, v/v). The assembled button battery is tested for electrochemical performance. The results show that the $SnO_2$@Sn coated reduced graphene oxide composite material ($SnO_2$@Sn@RGO-1) prepared in Example 3 has excellent cycle performance, rate capability and cycle stability.

The invention claimed is:

1. A preparation method of $SnO_2$@Sn coated RGO (reduced graphene oxide) composite material, comprising:

step 1: weighing a stannate and an organic compound, and dissolving the stannate and the organic compound in deionized water and organic solvent to obtain a solution with a concentration of 1.0 mol/L, and stirring the solution for 0.5 hours to obtain a milky white solution;

step 2: transferring the milky white solution obtained in step 1 into a polytetrafluoroethylene-lined high-pressure hydrothermal reactor, and holding at 150-220° C. for 15-30 hours;

step 3: cooling the solution in step 2, repeatedly centrifuging the cooled solution with deionized water and anhydrous ethanol at a centrifugal rate of 5000-10000 r/m; removing solution to obtain a white precipitate;

step 4: drying the white precipitate obtained in step 3 at 60-120° C. for 12-24 hours to obtain a white powder;

step 5: slowly adding a nitrate to a solution containing a strong acid, and stirring in ice bath for 0.5 hours;

step 6: cooling the solution in step 5 to −10-5° C., slowly adding graphite powder and strong oxidant, stirring in ice bath for 1-5 hours, and after cooling to room temperature, stirring at room temperature for 1-12 hours;

step 7: adding deionized water to the solution obtained in step 6, holding a temperature at 90-100° C., stirring for 0.5 hours, such that a color of the solution obtained in step 6 changes from dark green to bright yellow, and then cooling to room temperature:

step 8: adding an inorganic compound solution with reducibility to the bright yellow solution in step 7, stirring for 1 hour, standing for 10-24 hours, and pouring off a supernatant for 1-5 times;

step 9: adding deionized water to the solution obtained in step 8, and then stirring for 0.5-3 hours, and pouring off a supernatant to obtain a dark yellow solution;

step 10: slowly adding a strong base to the dark yellow solution obtained in step 9 until the dark yellow solution is neutral to obtain a brown solution;

step 11: adding deionized water to the brown solution obtained in step 10, and then stirring for 1-5 hours, and pouring off a supernatant;

step 12: adding an inorganic strong acid to the solution obtained in step 11, washing one time, and stirring for 0.5 hours;

step 13: cooling the solution obtained in step 12, and then centrifuging repeatedly for 0.1-1 hours with deionized water and anhydrous ethanol in a mass ratio of 1:2-8 at a centrifugal rate of 5000-10000 r/m, and pouring off supernatant repeatedly to obtain a black precipitate;

step 14: freeze-drying the black precipitate obtained in step 13 for 12-36 hours to obtain a black powder;

step 15: weighing the white powder obtained in step 4 and the black powder obtained in step 14 with a mass ratio of 3:0.1-10, and dissolving the weighed powder in deionized water, and ultrasonically dispersing for 0.5 hours;

step 16: drying the solution obtained in step 15 at 50-120° C. for 12-36 hours to obtain a black colloid;

step 17: heating the black colloid obtained in step 16 in an inert atmosphere from a temperature of 25° C. to 600-950° C. at a heating rate of 1-5° C./min; and then holding for 2-5 hours, and cooling to room temperature naturally to obtain the $SnO_2$@Sn coated reduced graphene oxide composite material ($SnO_2$@Sn@RGO).

2. The preparation method of $SnO_2$Sn coated RGO composite material according to claim 1, wherein a mass fraction of the $SnO_2$@Sn is 60-80%, a mass fraction of the reduced graphene oxide is 20-40%.

3. The preparation method of $SnO_2$@Sn coated RGO composite material according to claim 1, wherein in step 1, the stannate is a sodium stannate trihydrate, the organic compound is urea, and the organic solvent is anhydrous ethanol.

4. The preparation method of $SnO_2$@Sn coated RGO composite material according to claim 1, wherein in step 2, a holding temperature is 180-220° C., and a holding time is 15-20 hours.

5. The preparation method of $SnO_2$@Sn coated RGO composite material according to claim 1, wherein in step 3, the centrifugal rate is 8000-10000 r/m.

6. The preparation method of $SnO_2$@Sn coated RGO composite material according to claim 1, wherein in step 4, a drying temperature is 60-100° C., and a holding time is 12-24 hours.

7. The preparation method of $SnO_2$@Sn coated RGO composite material according to claim 1, wherein in step 5, the nitrate is sodium nitrate, and the strong acid is 98% concentrated sulfuric acid.

8. The preparation method of $SnO_2$@Sn coated RGO composite material according to claim 1, wherein in step 6, the solution in step 5 is cooled to −6-2° C., the strong oxidant is potassium permanganate, a stirring time in ice bath is 1-3 hours, and a stirring time at room temperature is 1-8 hours.

9. The preparation method of $SnO_2$@Sn coated RGO composite material according to claim 1 wherein in step 7, the holding temperature is 95-98° C..

10. The preparation method of $SnO_2$@Sn coated RGO composite material according to claim 1, wherein in step 8, the inorganic compound solution with reducibility is hydrogen peroxide solution, a standing time is 10-18 hours, and the supernatant is poured off for 1-2 times.

11. The preparation method of $SnO_2$@Sn coated RGO composite material according to claim 1 wherein in step 9, a stirring time is 0.5-2 hours.

12. The preparation method of $SnO_2$@Sn coated RGO composite material according to claim 1, wherein in step 10, the strong base is potassium hydroxide solution.

13. The preparation method of $SnO_2$@Sn coated RGO composite material according to claim 1, wherein in step 11, a stirring time is 1-2 hours.

14. The preparation method of $SnO_2$@Sn coated RGO composite material according to claim 1, wherein in step 12, the inorganic strong acid is 5% concentrated hydrochloric acid.

15. The preparation method of $SnO_2$Sn coated RGO composite material according to claim 1, wherein in step 13, the mass ratio of the deionized water and the anhydrous ethanol is 1:2-5, the centrifugal rate is 6000-10000 r/m, and a centrifugal time is 0.1-0.5 hours.

16. The preparation method of $SnO_2$@Sn coated RGO composite material according to claim 1, wherein in step 14, a freeze-drying time is 18-28 hours.

17. The preparation method of $SnO_2$@Sn coated RGO composite material according to claim 1, wherein in step 15, the mass ratio of the white powder obtained in step 4 and the black powder obtained in step 14 is 3:0.2-5.

18. The preparation method of $SnO_2$@Sn coated RGO composite material according to claim 1, wherein in step 16, a drying temperature is 60-100° C., and a drying time is 18-28 hours.

19. The preparation method of $SnO_2$@Sn coated RGO composite material according to claim 1, wherein in step 17, the inert atmosphere is one or more of nitrogen or argon:

the heating rate is 5° C./min, a holding temperature is 700-800° C., and a holding time is 2-3 hours.

* * * * *